(12) United States Patent
Goggins

(10) Patent No.: US 7,239,420 B2
(45) Date of Patent: *Jul. 3, 2007

(54) CORRESPONDING LENTICULAR IMAGING

(75) Inventor: Timothy P. Goggins, Nashotah, WI (US)

(73) Assignee: National Graphics, Inc., Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/532,588

(22) Filed: Sep. 18, 2006

(65) Prior Publication Data

US 2007/0013923 A1    Jan. 18, 2007

Related U.S. Application Data

(63) Continuation of application No. 10/194,747, filed on Jul. 12, 2002, now Pat. No. 7,136,185.

(60) Provisional application No. 60/305,095, filed on Jul. 13, 2001.

(51) Int. Cl.
  *G06F 15/00* (2006.01)
  *H04N 1/40* (2006.01)
  *H04N 1/405* (2006.01)

(52) U.S. Cl. .................... 358/1.2; 358/3.29; 358/3.3; 358/3.31

(58) Field of Classification Search ........... 358/1.2, 358/3.29, 3.3, 3.31, 3.32; 382/42; 359/619
See application file for complete search history.

(56) References Cited

U.S. PATENT DOCUMENTS

| 5,303,370 A | 4/1994 | Brosh et al. |
| 5,364,274 A | 11/1994 | Sekiguchi |
| RE35,029 E | 8/1995 | Sandor |
| 5,488,451 A | 1/1996 | Goggins |
| 5,494,445 A | 2/1996 | Sekiguchi et al. |
| 5,617,178 A | 4/1997 | Goggins |
| 5,695,346 A | 12/1997 | Sekiguchi et al. |
| 5,847,808 A | 12/1998 | Goggins |
| 5,896,230 A | 4/1999 | Goggins |
| 5,924,870 A | 7/1999 | Brosh et al. |
| 6,163,406 A | 12/2000 | Morton |
| 6,204,874 B1 * | 3/2001 | Michelson ............ 347/176 |
| 6,251,566 B1 | 6/2001 | Brosh et al. |
| 6,329,987 B1 * | 12/2001 | Gottfried et al. ........ 345/419 |
| 6,373,636 B1 | 4/2002 | Conley |
| 6,424,467 B1 | 7/2002 | Goggins |
| 6,490,092 B1 | 12/2002 | Goggins |
| 2002/0060376 A1 | 5/2002 | Nims et al. |
| 2002/0113829 A1 | 8/2002 | Nims et al. |
| 2002/0134495 A1 | 9/2002 | Franko, Sr. |
| 2002/0135873 A1 | 9/2002 | Franko, Sr. |

(Continued)

*Primary Examiner*—Jerome Grant
*Assistant Examiner*—Houshang Safaipour
(74) *Attorney, Agent, or Firm*—Whyte Hirschboeck Dudek SC

(57) ABSTRACT

Disclosed herein is a method of making a corresponding lenticular image comprising: providing an output device in communication with a computer having a memory; receiving into the computer memory an interlaced image file; converting the interlaced image file into an output having an output resolution; varying the resolution of the output to define a varied output resolution; and creating a corresponding lenticular image using the output at the varied output resolution. In a preferred embodiment, the output device is a plate setter and the output is a plate. As such, in at least one embodiment, the method is suitable for use with a Computer-to-Plate ("CTP") system.

12 Claims, 10 Drawing Sheets

U.S. PATENT DOCUMENTS

2002/0149846 A1 10/2002 Goto et al.
2002/0196466 A1 12/2002 Peterson
2002/0198724 A1 12/2002 Peterson
2003/0001916 A1 1/2003 Zhao et al.
2003/0011824 A1 1/2003 Pilu

* cited by examiner

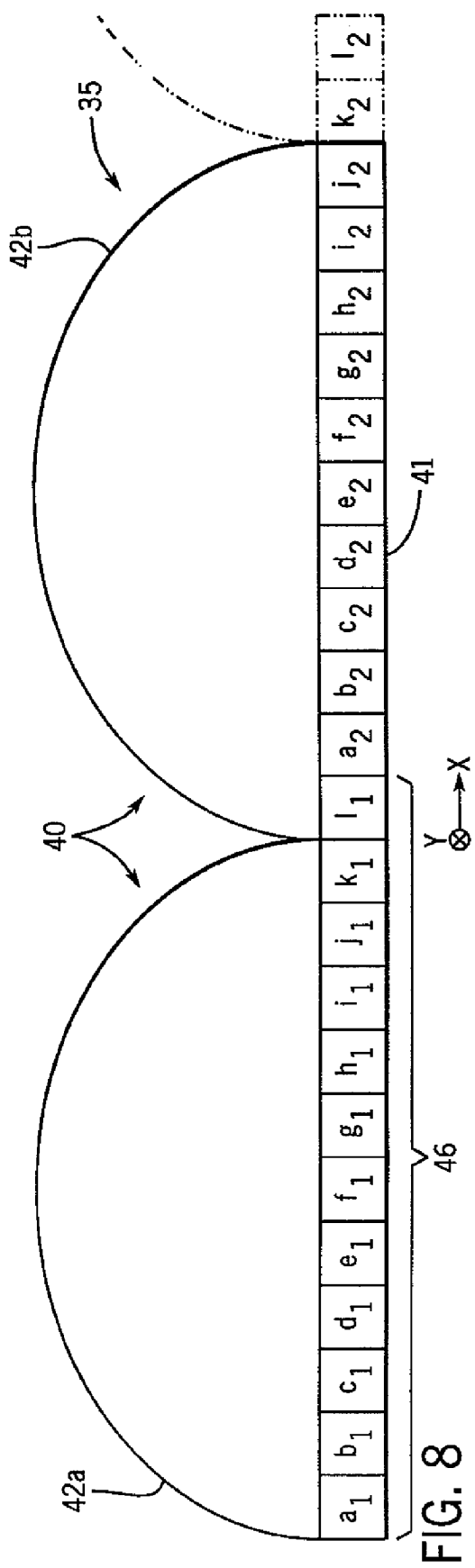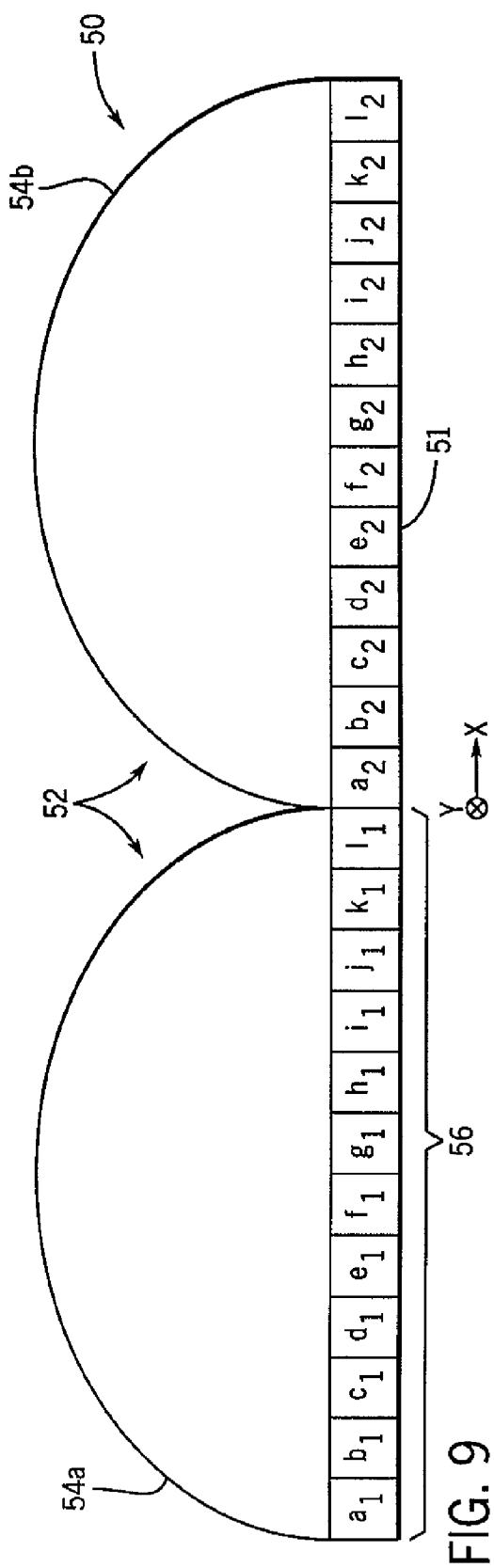

CORRESPONDING LENTICULAR IMAGING

CROSS REFERENCE TO RELATED APPLICATION

This application is a continuation of U.S. patent application Ser. No. 10/194,747, filed Jul. 12, 2002, now U.S. Pat No. 7,136,185 pending, which claims priority to U.S. Provisional Patent Application Ser. No. 60/305,095 filed Jul. 13, 2001, the teachings and disclosures of which are incorporated herein by reference.

FIELD AND BACKGROUND OF THE INVENTION

The present invention relates to lithography. In one aspect, the invention relates to creating a lenticular image that can impart the illusion of multidimensionality and/or motion, and more particularly, to creating a corresponding lenticular image created from an output having an output resolution that has been varied to obtain a varied output resolution.

Lenticular images are created by joining an interlaced image to a lenticular lens, described in greater detail below. Lenticular lenses are known and commercially available. These lenses typically consist of an array of identical cylindrically-curved surfaces that are extruded, embossed or otherwise formed on the front surface of a plastic sheet, although other geometric patterns are possible and known, e.g., pyramidal, and these too can be used in the present invention). Each individual lens or lenticule is typically a section of a long cylinder that typically extends the full length of the underlying image to which it is laminated (either directly or indirectly as described below). Alternatively, lenticules can take other shapes, for example, a parabolic or truncated cylindrical shape. The back surface of the lenticular lens, i.e., the surface to which an underlying image is joined, is typically flat or substantially flat. One example of a lenticular lens that can be used in the present invention is described in U.S. patent application Ser. No. 09/816,435, incorporated by reference herein.

Due to variables in production such as, for example, the material used (lenticular lenses are typically made from plastic materials), high temperatures, different tolerances depending on machines or production methods used, and the like, lenticular lenses can vary from lot to lot. Such variance can affect the quality of the end lenticular product and introduce complications in the production processes. Thus, it would be desirable to determine and implement a lenticular imaging method that results in interlaced images that correspond to lenticular lenses while minimizing the effects such varying lenticular lens have on such correspondence.

Color scanners break down images into a plurality continuous tone primary color separations (i.e., red, green and blue). These separations are converted to subtractive primaries (i.e., cyan, magenta, and yellow) plus black for printing. Alternatively, hi fi, hexachrome or other color gamut separations can be used, further converting the primaries into narrower color hues (e.g., cyan, magenta, yellow, green and orange) plus black. Regardless, the conversion represents the original picture.

Methods for producing multidimensional lithographic separations as well as multidimensional composite images are known in the art, as is illustrated by U.S. Pat. Nos. 5,488,451, 5,617,178, and 5,847,808, each of which is incorporated herein by reference. Multidimensional imaging on a curved surface has been taught in U.S. patent application Ser. No. 09/536,246, which is incorporated by reference herein.

Digital images are two dimensional, that is, they have a width and a height. It is standard practice in the graphic arts industry for digital images to have a single resolution. Graphical imaging equipment includes, for example, digital cameras (e.g., the Camedia E10 available from Olympus Inc., located in Tokyo, Japan, and the Optura, available from Canon Inc., located in Tokyo Japan), digital scanners (e.g., SNAPSCAN 1236, available from AGFA-Gevaert, N.V.) and imaging software (e.g., Adobe™ Photoshop™). Scanners such as the SNAPSCAN are used to achieve higher resolutions of digital images. Such scanners can scan, for example, at 1200 pixels per inch in a first direction and 600 pixels per inch in a second direction. The scanner typically scans at a high resolution in one machine direction and interpolates the lower resolution upward, since the lower resolution is typically a factor of the higher resolution. Thus, a single resolution (typically the higher resolution) is obtained through interpolation. The single resolution can be accommodated by the associated software, and the software uses the single resolution image file for both directions of the two dimensional digital image. Interlaced images, described in greater detail below, can be created from digital frames.

It is well known in the graphic imaging art that images can be created using a computer system and stored using one of a number of computer readable mediums. These mediums can include, for example, RAM, hard drive, CD ROM, DVD, tape, and optical means. A variety of file formats can be used, for example, TIFF, JPEG, Photoshop®, and EPS, among others.

Output devices, such as inkjet printers, typically take a single resolution image and then typically output the image, again, at a single resolution, One such output device is the Stylus Color 980N, available from Epson America, Inc. of Longbeach, Calif. In some cases, the device can output an image at two resolutions.

Creating an interlaced image having two distinct resolutions ("interlaced image resolutions" or "interlaced resolutions"), however, is missing in the prior art. As used in this application, "distinct resolutions", means resolutions that are independent of each other. Moreover, creating interlaced images having non-integer (also referred to herein as "non-whole number" or "floating point") resolution values is missing in the art.

In these instances, the device is typically set at its highest resolution output mode, such as 2880 dots per inch ("dpi") by 720 dpi, or alternatively, 1440 dpi by 720 dpi. As such, the second resolution is merely a factor of the first resolution, Computer-to-Plate (CTP) technology is a plate-imaging process in which printing plates are imaged directly from digital files. As such, the need for photographic films is eliminated. Components of a typical CTP system include a raster image processor (RIP), a plate-storing location, a device(s) for removing slip sheets, a punching device(s), system(s) for loading and unloading plates, a plate setter, and a post-processing system.

It would be desirable to create corresponding lenticular images that can provide a desired special effect in a manner that can accommodate a variety of factors, for example, multiple frame resolutions that can characterize digital frames. Such corresponding lenticular images could preferably be created to have non-integer or floating point resolutions. Ideally, the corresponding lenticular images would minimize, if not eliminate, distortion (e.g., banding).

It would also be desirable to output an image for use in a lenticular image utilizing an output device capable of achieving a varied output resolution in at least one direction, as well as a distinct second resolution in a second direction. It would be desirable if such images could be output at non-integer or floating point resolutions in either or both directions. In sum, if the above could be achieved, lenticular images of improved clarity and detail could be created, lenticular images that could better convey a desired special effects of multidimensionality to the intended viewer.

SUMMARY OF THE INVENTION

The present invention provides a novel and efficient method for providing lenticular images.

In one aspect, a method of making a corresponding lenticular image is disclosed herein, the method comprising: providing an output device in communication with a computer having a memory; receiving into the computer memory an interlaced image file; converting the interlaced image file into an output having an output resolution; varying the resolution of the output to define a varied output resolution; and creating a corresponding lenticular image using the output at the varied output resolution. In a preferred embodiment, the output device is a plate setter and the output is a plate.

The present invention provides a method of creating multidimensional lithographs and/or images in which the interlaced image has been subject to little, if any, scaling, averaging, reduction or other manipulation that results in a reduction of image pixels.

Thus, when compared to multidimensional images of the prior art, multidimensional images of the present invention are characterized by increased image quality and clarity, and reduced blurring, or other distortion in the image. Moreover, multidimensional mages, especially those that convey the illusion of motion and depth can be more contiguous and less disjointed.

These and other important features, hallmarks and objects of the present invention will be apparent from the following descriptions of this invention which follow.

BRIEF DESCRIPTION OF THE DRAWINGS

FIG. 8 is a schematic end view of a lenticular image in which an interlaced image is joined to the lenticular lens showing a lack of correspondence between interlaced image segments of the interlaced image and the lenticules of the lenticular lens;

FIG. 9 is a schematic end view of a lenticular image in which an interlaced image is joined to the lenticular lens showing correspondence between interlaced image segments of the interlaced image and the lenticules of the lenticular lens;

DETAILED DESCRIPTION OF THE PREFERRED EMBODIMENTS

Figure 1:
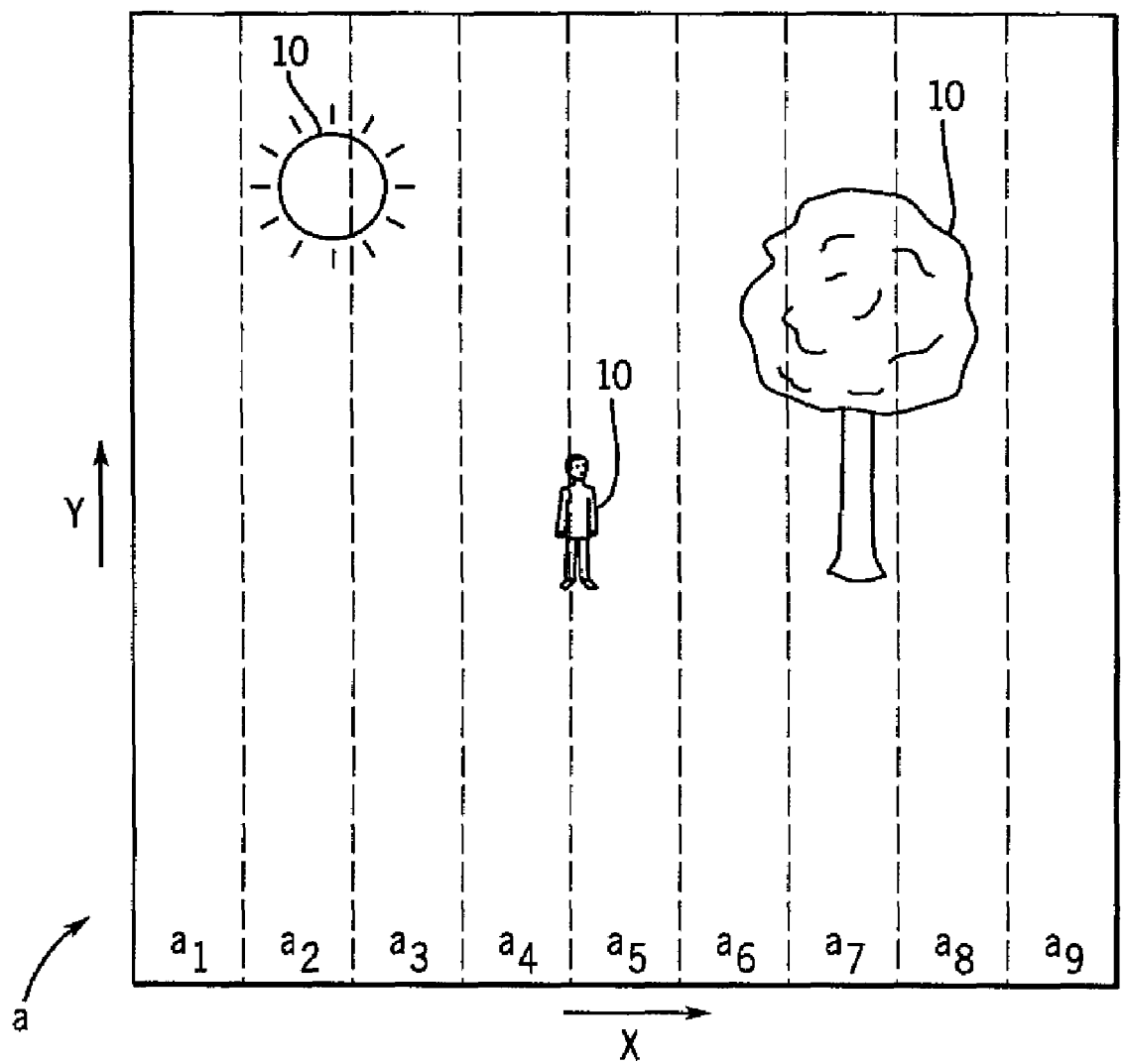
FIG. 1 is a schematic illustration of a digital frame with a plurality of digital frame segments that can be used with the present invention.

The lenticular images of this invention can tell a story, show events over time, and can show an object in perspective. A fourth dimension (motion, with or without depth) can also be imparted by lenticular images. Thus, "lenticular images" are images that are used to convey the illusion of multidimensionality (i.e., depth, with or without motion).

The concept of a lithographic motion picture (i.e., a lithograph that imparts the illusion of motion) can be explained by reference to motion picture films. These films consist of a series of still image frames or pictures. If these frames are projected in the proper sequence and at a proper frequency (e.g., 24 frames per second), then the illusion of motion is created to a viewer viewing the frames. In this way, the human brain can perceive motion from the series of still pictures.

This invention can produce lithographs of photographic quality that impart the illusion of motion and/or depth to a viewer. These lithographs have many possible uses such as pages with animations that move, movies condensed to a series of scenes that can be played repeatedly by the viewer, point of purchase displays incorporating motion graphics, images and animation, cups, and packaging and labeling applications.

A lenticular image comprises an interlaced or precursor image that is joined to a lenticular lens for which it is designed and to which it shall correspond or substantially correspond so as to create a lenticular image that can impart an illusion of depth, again, with or without motion to a viewer. As used here, "joined" is typically the printing of the interlaced image directly to or on a flat or substantially flat back surface of the lenticular lens itself, but this joining as used here includes indirect printing which includes the lamination (e.g., using an adhesive) of the lenticular lens to the surface of the interlaced image that itself has first been printed to a substrate (e.g., paper, synthetic paper, plastic, metal, glass or wood). Joining can be permanent, semi-permanent, or temporary as appropriate to the application at hand. When printed directly to the flat back surface of the lenticular lens, the interlaced image can be displayed to a viewer using, for example, transmissive light (i.e., light passing through the lens), back-lighting, or in a reflective manner using an additional reflective coating or surface. The reflective coating can preferably be an opaque white or other suitable reflective coating and the surface can comprise, for example, paper. One use of a reflective coating applicable for use here is described in detail in U.S. Pat. No. 5,896,230, the disclosure of which is incorporated by reference herein.

The illusion of multidimensionality, with or without motion, is created when a viewer views the interlaced image through the lenticules of the lenticular lens at an appropriate viewing distance. The typical viewing distance for a viewer can vary. For example the view distance can be long (e.g., 12-20 ft.), or short (e.g., arm's length). The viewing distance is typically predetermined, depending on the product or particular application (e.g., packaging, labeling, and containers, among others).

Referring to FIG. 1, a schematic illustration of a digital frame "a" is shown. Digital frame "a" is representative of the digital image that is stored in a computer file. A digital frame is made from base pictures or base images, collectively referred to by numeral 10, that are in electronic (i.e., pixel) form. Illustrative images 10 (e.g., a tree, a person, etc.) can include: photographs, graphics, typeface, logos, animation, video, computer-generated or digital art, vignettes, tints, dimensional art, graphs, charts, vector art and similar information. These images can be in digital form initially, for example, if they are created using a digital camera or digital video camera. If the base images are not initially in digital form (i.e., they are in analog form), then they can be converted into digital form using, for example, optical scanning apparatuses and methods.

Once the base images are converted into digital form, the digital frame "a" can be created. Digital frame "a" can be made using software programs known to those of skill in the art, for example, Adobe® Photoshop®. The complexity of digital frame "a" depends on a number of factors, for example, the number of base images, whether vector and/or graphic components are used to make up the frames, and the desired effect of the final interlaced images (i.e., multidimensionality with or without motion). Using Adobe® Photoshop®, digital frames can have images placed within them at different "layers", meaning that the images can be added, subtracted, moved, sized, adjusted, filtered or otherwise manipulated to a user's convenience to accomplish the desired illusions or special effects.

Digital frame "a" is two-dimensional, that is, it has a width and a height. As here used with respect to digital frame "a", the frame width corresponds to an "x" direction (also called a "first frame direction") and frame height corresponds to a "y" direction (also called a "second frame direction"). As a practical matter, digital frame "a" is representative of the image that is stored in a computer file, or the image prior to output. It is contemplated that varying the x frame direction in this pre-output image file is possible.

Numerous data entry conventions may be used. For example, in a preferred embodiment, using conventional software, a single digital frame resolution can be selected or input for both the width and height directions of a digital frame "a". "Digital frame resolution" or simply "frame resolution" means a resolution that corresponds to a predetermined number of pixels per lineal distance, such as inches, centimeters, picas, etc. In some applications it may be standard or common practice to enter a single value representative of first and second frame resolutions (i.e., a "square frame resolution"). Thus, digital frames are "square" and have "square frame resolutions" when they have identical or substantially identical resolutions that correspond to first and second frame directions.

In another preferred embodiment, a first digital frame resolution and a distinct second digital frame resolution can be input for the width and height directions of digital frame "a". Such frames may be constructed to be "non-square" and characteristically comprise "non-square frame resolutions" (i.e., different resolutions for the width and the height).

Additionally, frames can be constructed to be "square", even though they may include distinct first and second digital frame resolution inputs.

In order to create an interlaced or precursor image that will provide a viewer with an illusion of multidimensionality (i.e., when the interlaced image is joined to and viewed through an appropriate lenticular lens), the digital frame "a", is segmented (i.e., divided) into frame segments (i.e., $a_1$, $a_2$, $a_3$, ..., $a_9$). As a practical matter, a segment of a frame is typically in the form of a rectangular column and the height and width of each such column is typically the same, from column to column (i.e., the height and width of frame segment $a_1$ is typically the same or substantially the same as the height and width of frame segment $a_2$).

Additional digital frames can be created in a similar fashion to that of digital frame "a", and similarly segmented into digital frame segments. For example, a second frame "b" (not shown) can be segmented into segments $b_1$, $b_2$, ..., $b_9$. Once created, the digital frames can be ordered, and their respective frame segments interlaced into a desired sequence to create an interlaced image. The "desired sequence" of digital frames (and their respective frame segments) is the sequence that can impart the desired illusion of multidimensionality to a viewer of the interlaced or precursor image when the image is joined to, and viewed through, a lenticular lens.

Typically, twelve digital frames are interlaced with one another to create an interlaced image, although the number of frames can vary to convenience, for example from 2 to 96, or even more. Digital frames can be repeated when ordering and creating the interlaced image. In this way, certain of the digital frames can be given additional weight relative the other digital frames in the interlaced image, and ultimately, the lenticular image. Digital frames that are given greater weight in the interlaced image are commonly referred to as "hero" frames.

Figure 2:
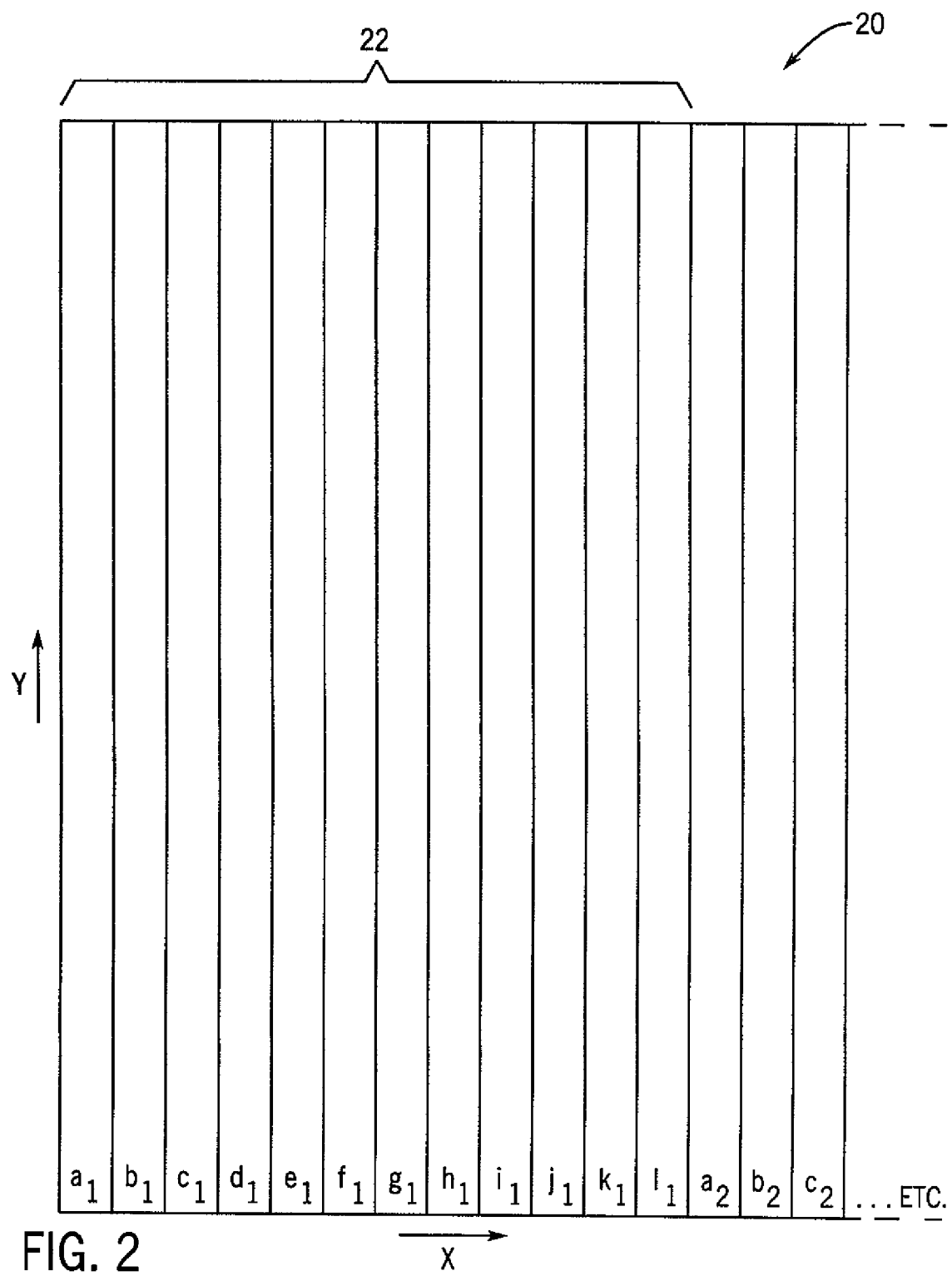
FIG. 2 is a schematic illustration of an exemplary interlaced image having a plurality of digital frame segments and with the image shown prior to joining the interlaced image to a lenticular lens.

FIG. 2 shows a schematic illustration of an interlaced image 20. Interlaced image 20 is representative of the interlaced image that is stored in a computer file. In general, interlaced image 20 comprises a plurality of digital frame segments that have been interlaced to create the interlaced image. Interlaced image 20 is formed from digital frames (i.e., digital frames "a", "b", "c", ..., "l"), each of which has been segmented into their respective digital frame segments $a_1$ through $a_9$, $b_1$ through $b_9$, and $c_1$ through $c_9$ (not all of which are illustrated). Digital frame segments ($a_1$, $b_1$, $c_1$, ..., $l_1$) make an interlaced image segment 22. As such, an "interlaced image segment" represents the unique frame segments of the digital frames arranged in the desired sequence.

Preferably, interlacing is accomplished using computer software designed for such interlacing. In another embodiment, the interlacing can be accomplished by manual manipulation of the pixels. However, as a practical matter, as images become more complex manual manipulation becomes more tedious and cumbersome and, as such, less practical. Masking, deleting, layering, or other pixel/image selection techniques can also be used to combine digital frames into an interlaced image.

The digital frame and interlaced image resolutions correlate to the orientation or direction of the lenticular lens to which the interlaced or precursor image will eventually be joined. The first or "x" (or negative x) direction is oriented substantially perpendicular to (also called "across") the lenticules of the lenticular lens to which it will be subsequently joined. The second or "y" (or negative y) direction, as used herein, is a direction substantially parallel to or "with" the lenticules of the lenticular lens. These orientations are described for clarity and specificity, and should not be interpreted in any limiting way, as other orientations besides the "x" and "y" orientations described here are possible. Moreover, as described herein, the "x" and "y" directions are oriented at 90 degrees to each other. However, it will be apparent to those of skill in the art that the frame and interlaced image resolutions can be oriented or arranged to correspond to other angles, directions as desired without departing from the scope of the invention.

Files are typically compressed to improve the efficiency of their storage (e.g., on a disk or other media) and transfer (e.g., over a network such as the Internet). In general, compression refers to the reduction of file size. There are generally two known types of compression, namely, "lossy" and "lossless". "Compression", as herein used, includes both "lossless" and "lossy" compression techniques. Moreover, it will be understood that, for purposes of this invention, the concept of compression includes "masking", "scaling" "interpolation", "deleting", "averaging" or any other technique in which pixels, pixel information, or digitized frame information is manipulated. In other words, the concept of "compression" as here used includes techniques in which some pixels are retained or discarded.

In a preferred embodiment it is contemplated that the digital frames can be compressed, segmented and subsequently interlaced. It is also contemplated that compression can take place prior to, after, or substantially simultaneously with or during the interlacing of the digital frame segments so to create a desired interlaced image.

When digital frames are compressed, whether the frames are square or non-square, compression takes place in the "x" or width direction. In the "x" direction, compression is expressed as the reciprocal of the number of frames per lenticule, i.e., compression=1/f, where "f" is the total number of frames in the interlaced image (e.g., if 12 frames are used, f equals 12 and compression is equal to $\frac{1}{12}$). In alternative preferred embodiments, compression in the "x" direction can also be expressed as a multiple, or factor, of 1/f. Preferably, digital frames are thus compressed such that the compression of each frame is a function of the total number of frames in the interlaced image.

Preferably little, if any, compression takes place in the "y" direction, although the resolution can be scaled to convenience. In the past, the "y" resolution of a digital frame was scaled according to L times f, (i.e., the "x" and "y" resolutions of the digital frames were one in the same). In a preferred embodiment, the "y" resolution of the compressed frame remains at the same resolution of the nonconpressed frame resolution in the "y" direction (i.e., a digital frame created at 300 pixels per inch at 100% resolution does not change).

Compression of the interlaced image made up of the digital frame segments can also be accomplished. Referring again to FIG. 2, directions can be assigned to the dimension of the interlaced image. It is contemplated that the interlaced image can have a distinct first interlaced image resolution in the width or "x" direction and a distinct second interlaced image resolution in the height or "y" direction.

The interlaced image resolution in the "x" direction is a pixel resolution that corresponds to the resolution of the line count of the lenticular lens ("l") times the number of frames ("f") used to create the interlaced image, or simply:

l×f.

Noting that this resolution (i.e., the "x" direction interlaced image resolution) is dependent on 2 variables (i.e., "l" and "f"), it becomes clear that there is an advantage to utilizing a device that can output a screened interlaced image at a resolution that can be varied in at least one direction (here the "x" direction) that corresponds to the interlaced image resolution.

It is contemplated that the "x" direction" resolution can also be a multiple or factor of 1 times f. Moreover, the line count of the lenticular lens can vary to convenience, and is typically between 10 and 400, or even more lines per lineal inch (lpi). The line count or "pitch" is highly dependent on the application at hand. For example, a coarse lens (e.g., on the order of about 10-50 lpi) can be used for a bus shelter signage. Even coarser lenses can be used in certain other applications, such as billboards. On the other hand, a fine lenticular lens (e.g., on the order of about 150-400 lpi) can typically be used for a label comprising small type fonts or sizes (e.g., on the order of about 9 pts. or even less).

The "y" direction of the interlaced image correlates to the "y" direction (or second frame resolution) of the digital frame. Interlacing does not take place in the "y" direction. As such, pixel information (again the frames are in digital form) in the "y" direction typically remains in a noncompressed or essentially noncompressed state. It is noted, however, that the "y" direction resolution can also be varied, for example, by scaling the resolution up or down. Alternatively, the size of the interlaced image itself can be scaled up or down in the "y" direction, with or without scaling of the resolution in the "y" direction.

Thus, as oriented and described herein, the "y" direction resolution, whether referring to the digital frame or the digital interlaced image, is a resolution that is distinct from the "x" direction resolution. Preferably, the "y" direction resolution is a factor or multiple of the "fixed" resolution of the engine or device (i.e., the "machine resolution") used to accomplish screening. However, this is not required since, for example, the resolution can be an independent resolution (e.g., 300 dots per inch or dpi, or ppi, or any metric equivalent).

One hallmark of the present invention is that the interlaced image resolution in the "y" direction can be set to non-integer values, with such non-integer values being independent of "x" direction output resolution. In one example, an image resolution value is in metric units, such as for example, 120 pixels per centimeter (in English units, a typical image resolution is 300 ppi). Metric input devices, for example, the Hell Chromagraph CP 340 scanner can be used to accommodate metric values. In metric units, a typical output resolution is 120 pixels per centimeter ppc). In one conversion, 120 ppc are multiplied by 2.54 centimeters per inch (cpi) to arrive at the English units equivalent of 304.8 ppi, a non-integer value.

"Screening" refers to the process of converting a continuous tone image to a matrix of dots in sizes proportional to the highlights (i.e., the lightest or whitest area of an image) and shadows (i.e., the darkest portions of the image) of the continuous tone image. Image screening techniques can include, for example, half-tone screening and stochastic screening. In conventional half-tone screening, the number of dots per inch remains constant, although the size of the dots can vary in relation to the tonal range density of the pixel depth that they represent. When making color separations, screen angles must be rotated so as to avoid moire interference. Moire is an undesirable optical effect that results from an out-of-register overlap of patterns. Conventional screen angles of rotation that can be used to eliminate or substantially eliminate moire interference are: 0 for yellow, 45 degrees for magenta, 75 degrees for cyan, and 105 degrees for black. Since angles can be interchanged, or skewed, as a whole, dots composed of multiple pixels, can create moire problems which are essentially the result of repetitive nature of the dissimilar pixels. Moreover, the angling of the half tone screens can result in a rosette pattern.

Half tones can interfere with viewing the image through the lenticular lens by creating screen interference and/or moire.

Stochastic or frequency-modulated (FM) screening can create the illusion of tone with variably-spaced dots. Stochastic screening techniques typically yield higher resolutions than are typically obtained in conventional half-tone dot screening. Stochastic screening utilizes finer spots, and results in a higher resolution such that screen rotation, and the formation of rosette patterns can be eliminated. Stochastic screening techniques can virtually eliminate moire and screen interference. Stochastic screening can result in higher dot gain on press and, when making a plate or a proof precise exposure control is needed. Still, plate setters eliminate the step of creating a film and the additional dot gain that accompanies its production. Plate setters can be calibrated for accurate screen reproduction. In general, stochastic screening is preferable when smaller or finer images are utilized, for example, on the order of 30 to 10 microns, or even less.

If the digital frames have identical first and second resolutions (i.e., a square frame), screening can be accomplished according to screening technologies already known to those of skill, for example, halftone or stochastic screening.

If the digital frames comprise distinct first and second resolutions (i.e., a non-square digital frame), screening of the digital frame or interlaced image files can include screening in a distinct first direction and a distinct second direction that correlate to the "x" and "y" directions described above. Thus, it is contemplated that, if desired, different screening algorithms or techniques can be used for each of the directions corresponding to the digital frame or interlaced image file being screened. For example, halftone screening can be used in the first (e.g., "x") direction and stochastic screening can be used in the second (e.g., "y") direction, or vice versa. In short, it is contemplated that the approach to the screening can be distinct and different in two different directions, if this is desired.

It is further contemplated that screening, whether using halftone, stochastic, or any other technique, can take place prior to interlacing, after interlacing but prior to sending the interlaced image to an output device (preferably a high resolution output device), or after sending the interlaced image to the Raster Image Processor, that is, a "RIP", (e.g., Scriptworks®, available from Harlequin® of Chicago) of the output device. Raster data prints a page as a pattern of dots or spots. To place the dots, the RIP maps out the page as a grid of spot locations—called a bitmap. Thus, a RIP converts the interlaced image file to bitmap data for ouputting since bitmapped data can be accommodated by the output device that ultimately outputs the final image (i.e., an interlaced image which is joined to a lenticular lens) as dots.

The screened interlaced image is output at a resolution corresponding to its x-direction digital resolution, and at a size that corresponds to the lenticular lens which will eventually overlay it. The interlaced image can be output to any high-resolution output device which can eventually create a lithographic separation, e.g., a plate, a film, proof, etc. This separation can then be used to create the print to which the lenticular lens can be laminated by any conventional technique. In a preferred embodiment of this invention, the composite image is printed directly to the reverse or back side of the lenticular lens and displayed to the viewer when the image is viewed by a viewer through the lens.

It is a hallmark of the present invention that the output device resolution can correspond to the "x" direction resolution of the interlaced image, which in turn can correspond to the pitch of the lenticular lens. It is noted that, more likely than not, the interlaced image and output device resolutions will comprise at least one non-integer or floating point resolution.

The interlaced image can be output to an high resolution output device, or simply "output device", such as a plate setter, image setter, inkjet printer, digital press, electrostatic printer, or laser printer, in short, any device that is capable of receiving an interlaced image file and creating a film separation, a printing plate, a digital proof, or other output having the interlaced image represented thereon. As such, as used herein, "output device" refers to devices that result in an interlaced image being printed directly or indirectly to a lenticular lens. If the interlaced image is sent to a digital printing device, the interlaced image can be directly printed to the lenticular lens, or indirectly applied to the lenticular lens, that is, the image is first printed to a substrate and then joined to the lens.

Preferably, the interlaced image is sent to an image setter or plate setter. With respect to an image setter, a film separation is created, and from the separation, a proof and/or plate is created. The proof can then be laminated to the lenticular lens, again such that the image and lens are in correspondence. Alternatively, a plate can be created by a plate setter such that the interlaced image is printed, again either directly or indirectly to the lenticular lens. In this case, a plate is created and used to print the image to the lens such that the image and lens are in correspondence. When using a plate setter, a direct digital proof is preferably created to verify the integrity of the image, in other words, the ability of the image to convey to a viewer viewing the image at the appropriate viewing the special effect illusion of multidimensionality. Image quality, color, content, among other features, is also examined and verified. A plate separation can be used, preferably for printing directly to the reverse side of the lenticular lens, and a plate separation can be also used to create the print to which the lenticular lens is laminated by any conventional technique.

A device that can expose lithographic printing plates and color proofing materials in a manner that accomplishes the present invention is known, and is described in detail in U.S. Pat. No. 6,204,874, the teachings of which are incorporated by reference here.

More specifically, U.S. Pat. No. 6,204,874 is directed to a thermal plate setter and color proofer that provides a single device capable of automatically loading printing plates and proofing sheets onto the same drum and using a single laser head to expose both. The invention this patent combines is a Computer-to-Plate (CTP) system using a thermal imaging head with a thermal proofer. Proofs are loaded using a sheet feeding tray in which the materials are stacked in the same order the proofer uses them: a receiver sheet followed by four different donor sheets, this sequence being repeated many times. Donor sheets are larger than the receiver sheet to allow the vacuum around the receiver sheet to hold the donor sheets. Means of loading the sheets onto the drum are provided, preferably a hinged tray, in order to bring the sheets into contact with the drum, allowing the drum to grip a sheet from the tray, using the vacuum holes in the drum. Discarded donor sheets are unloaded into a second tray. Sequencing of the sheets in the tray can be done by pre-packing them by the supplier in the correct sequence or by the user of the color proofer, allowing for addition of customized colors and replacement of sheets with different colors. The printing plate can be loaded in the same tray as the proofing materials or have separate loading means. The preferred embodiment uses an external drum exposure unit and a thermal exposure head, the term "thermal" referring to the fact that the marking is performed by heat that is created, for example, by a laser.

An example of a thermal imaging unit is a TRENDSETTER™ plate setter manufactured by Creo Products, Inc., located in Burnaby, B.C., Canada). The APPROVAL digital proofer, manufactured by the Kodak Co., located in Rochester, N.Y., is an example of a digital printer/CTP ("Computer-to-Plate) device.

As described in U.S. Pat. No. 6,204,874, pre-sequenced sets of donors and receivers can be loaded onto the drum in a manner that allows the production of multiple proofs in an automated fashion as well as the production of printing plates. The carrier can be the lenticular lens. To use the system for imaging printing plates, the plates can be placed in the loading tray as the proofing materials or a separate loading tray or loading ramp can be used, with such methods of loading being well-known in the art. As such, U.S. Pat. No. 6,204,874 is directed, at least in part, to a CTP device that can image to a film, to a proof, and/or to a plate utilizing an external exposing drum.

The proof or image can be exposed directly to the lens within the specific device. For example, the device described in the U.S. Pat. No. 6,204,874 is one example of a device that is capable of outputting at a variable resolution in at least one direction, and more importantly, capable of outputting at a distinctly different resolution in at least one other direction. In general, a device such as this one is capable of outputting an image at two distinct resolutions (for example the resolutions correlating to the "x" and the "y" directions described above), at least one of which is variable and may include non-integer values.

Accomplishing the present method of creating and preparing a lenticular image comprising an interlaced image having a first interlaced resolution and second interlaced resolution, for example the fixed and variable resolutions described above, requires a suitable output device.

Figure 3:
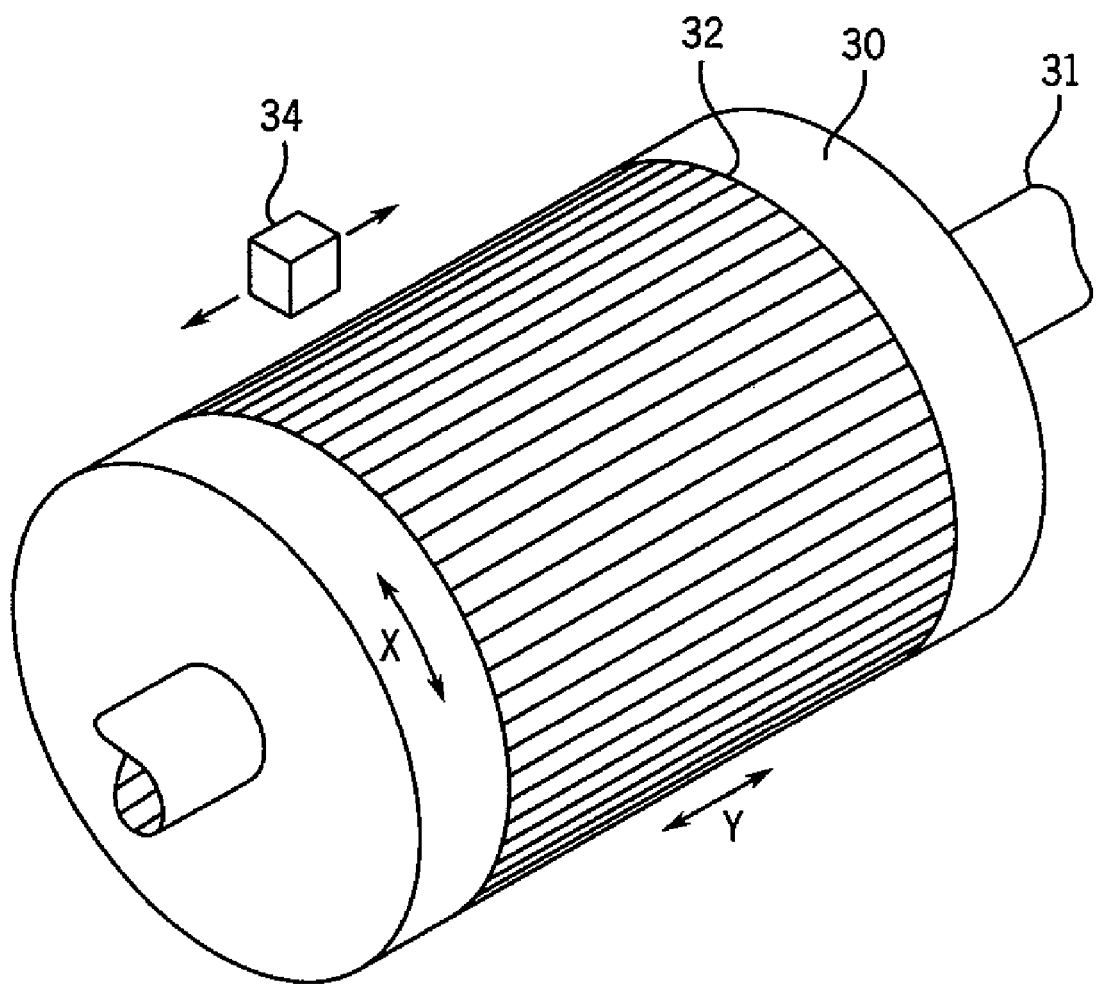
FIG. 3 is a schematic illustration of one embodiment of a portion of an output device that can be used to vary the resolution of the output according to one aspect of the present invention.

FIG. 3 is a schematic illustration of one embodiment of a portion of a suitable output device according to one aspect of the present invention. Specifically, a schematic illustration of drum 30 is shown which can be used in a plate setter output device (not shown). The drum can rotate on shaft 31. Directions can be assigned to drum 30 so as to correlate to the "x" and "y" directions described above with respect to the digital frames and interlaced images. For purposes of clarity and as used herein, the "x" direction refers to the direction around the drum and the "y" direction refers to the direction along the drum. An output, specifically plate 32 is shown wrapped around and fastened to drum 30 such that the plate rotates along with drum 30. As plate 32 rotates in the "x" direction, exposure element 34 (schematically illustrating, for example, an array of diodes) exposes the plate in a known fashion to correlate with the interlaced image file. As a practical matter, element 34 moves parallel to the "y" direction shown such that, in combination with the rotational movement of drum 30 in the "x" direction, exposure of the plate 32 can occur as desired.

Timing is critical to the proper exposure of plate 32, which is accomplished by the movement of drum 30 carrying the plate relative the movement of exposure element 34. Proper timing necessitates the use of time-keeping element(s) (e.g., at least one clock, and typically at least two or more clocks). One such clock is a Mainscale Scan Adjustment ("MSA"). Adjusting the MSA permits the control and fine tuning of the timing of image creation on the plate secured to the drum of the output device. Stated another way, the MSA changes the rate at which exposure of the plate occurs, resulting in a change in image size.

As one example of an MSA, an interlaced file that has been sent to a RIP resulted in a file having a non-square resolution of 2436 ppi by 2400 ppi. A plate is created and a precursor image is printed to the lenticular lens. If the image does not correspond to the lenticules of the lenticular lens, an MSA is made in the following manner: first, the output is measured and compared against a lenticule measurement to determine whether the output resolution, in this case 2436 dpi must be adjusted upward or downward (i.e., larger or smaller), and by the requisite amount. For a desired output of 2438 dpi, the resolution must be adjusted upward by 2 dpi. The value of 2436 dpi is multiplied by a factor of $10^{-6}$ to obtain a value that corresponds to the MSA clock in a unit value of parts per million. The difference in the number of dots in the differential, 2, is then divided by the clock value in parts per million, 0.002436, thereby resulting in a value of approximately 821. This value is the adjustment value that is used by the MSA clock to adjust the timing of the exposure around the drum so as to approximate, as nearly as possible, the desired output value of 2438 dpi for correspondence to be achieved between the interlaced or precursor image and the lenticular lens to which it is to be joined. A new plate is created, and an image is printed to a lenticular, and correspondence between the lens and image is checked. If correspondence is achieved, a print run of suitable lenticular images providing the desired special effect at the appropriate viewing distance is initiated. If not, another MSA calculation is made as described in this paragraph above, and a new plate is made.

Figure 4:
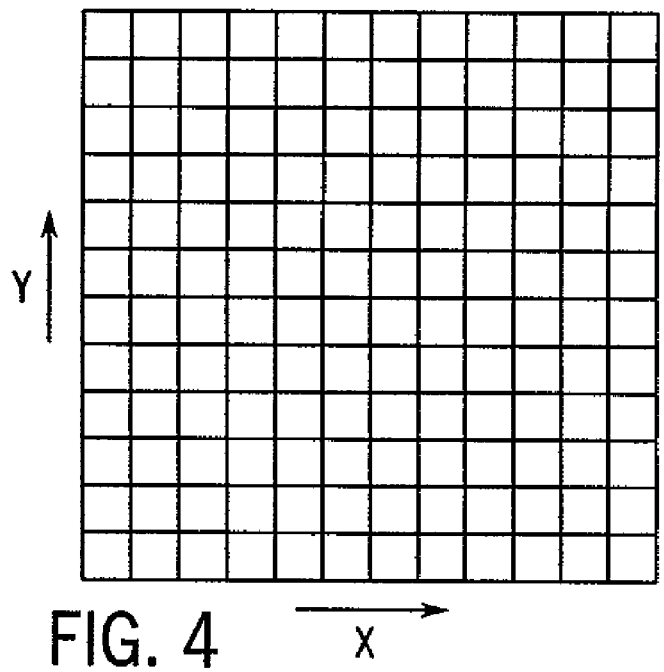
FIG. 4 is a schematic plan view of a pixel grid of a high resolution output according to one aspect of the present invention having an output x resolution.
Figure 5:
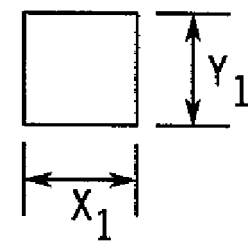
FIG. 5 is an enlarged schematic illustration of a representative pixel from the pixel grid of FIG. 4.
Figure 6:
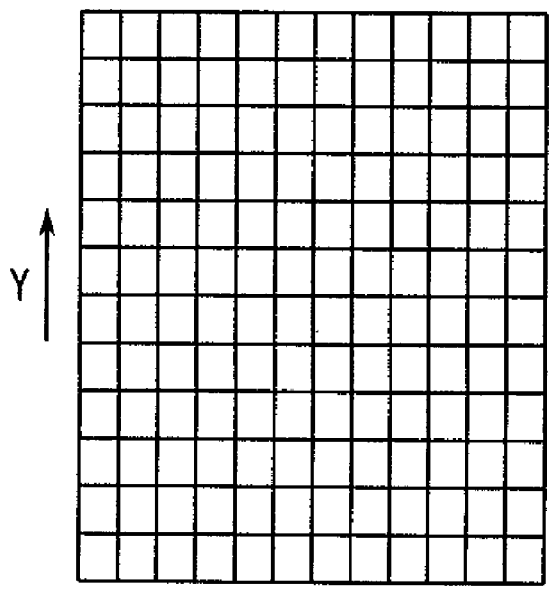
FIG. 6 is a schematic plan view of a pixel grid of a high resolution output according to one aspect of the present invention having an output x resolution that is less than the output x resolution of FIG. 4.
Figure 7:
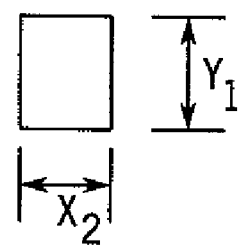
FIG. 7 is an enlarged schematic illustration of a representative pixel from the pixel grid of FIG. 6.

FIG. 4 is a schematic plan view of a pixel grid of a high resolution output, the output having an output x resolution (i.e., an output resolution in the x direction), according to one aspect of the present invention. FIG. 5 is an enlarged schematic illustration of a representative pixel from the pixel grid of FIG. 4. FIG. 6 is a schematic plan view of a pixel grid of a high resolution output according to one aspect of the present invention having an output x resolution that is less than the output x resolution of FIG. 4. FIG. 7 is an enlarged schematic illustration of a representative pixel from the pixel grid of FIG. 6.

In FIGS. 4-7, $x_1$ illustrates an output pixel width in the output x direction and $y_1$ illustrates an output pixel width in the output y direction. Similarly, $x_2$ illustrates another output pixel width in the output x direction. To obtain a desired result, in the circumstance illustrated, the width of $x_2$ is less than the width of $x_1$, while maintaining the output pixel width in the y direction constant at $y_1$. In this fashion, $x_2$ is selected by varying the output x resolution to achieve correspondence between the interlaced image and the lenticules of the lenticular lens to which it will ultimately be joined. It is contemplated that the width of $x_2$ could also be greater than then width of $x_1$.

Thus, in a preferred embodiment, the output x resolution can be varied such that the resolution corresponds to the pitch of the lenticular lens "l" times the number of digital frames "f", as described above, or a multiple or factor thereof. Thus, in the "x" direction, the output resolution corresponds to the interlaced image resolution.

For example, a given lenticular lens may be created to have a pitch of 101.5 lpi. In accordance with the formula l times f, an interlaced image comprising 24 digital frames results in an "x" direction interlaced image resolution of 2436 ppi, or alternatively, a multiple thereof. In order to achieve correspondence between the interlaced image resolution and the lenticular lens, the output device resolution is varied to 2436 dpi (rather than, for example, a fixed machine resolution of 2400 dpi) in the "x" direction. Thus, the present invention achieves an output resolution that can be varied to achieve a varied output resolution, here in a direction across the lens (i.e., in the "x" direction).

Moreover, the output resolution can be varied in a precise manner to include non-integer resolution values. In fact, the typical output resolution value is a non-integer value. As one example, a lenticular lens can have a pitch of 101.512 lpi. Here, the "x" direction interlaced image resolution, again for an interlaced image comprising 24 digital frames, is 2436.288 ppi, (in accordance with the formula 1 times f). Here again, to achieve correspondence between the interlaced image and the lenticules of the lenticular lens, the interlaced image is preferably output at a resolution that is tuned to precisely correspond with the dimensions of the particular lenticular lens that is used to create the final lenticular image, here, a non-integer number.

The interlaced image is output at a "y" direction output resolution, which correlates to a machine resolution (i.e. high definition output device), for example the device described above in U.S. Pat. No. 6,204,874. "Machine resolution" refers to the output resolution(s) that a given output device can achieve. Unless otherwise noted herein, the "machine resolution" shall refer to the highest or finest possible output device resolution.

The "y" direction interlaced image resolution is selected to accommodate what is deemed required to obtain appropriate image detail and quality. The "y" direction output resolution is independent of the "y" direction interlaced image resolution. In other words, the "y" direction interlaced image resolution need not correlate, directly or indirectly, to the "y" direction output resolution. As such, it is not required that the image resolution be a factor or multiple of the "y" direction output resolution (i.e., the resolution of the output device in the "y" direction).

Furthermore, the "y" direction interlaced image resolution is distinct from the "x" direction interlaced image resolution. Typically, there is no correlation between the "y" direction interlaced image resolution and the "x" direction interlaced image resolution.

The "y" direction output resolution is distinct, and typically different, from the "x" direction output resolution. Again, the output resolution is distinct from the interlaced image resolution as well. Preferably, the machine resolution is typically set at 2400 dpi (or a factor thereof if set to a lower or coarser resolution). The "y" direction image output resolution is typically fixed at this distinct machine resolution. or alternatively, at a factor thereof (e.g., 1200 dpi, 600 dpi, 300 dpi, etc.). Thus, as described herein, the "y" direction output resolution is termed a "fixed resolution".

In a preferred embodiment, the "y" direction output resolution is a fixed machine resolution, for example, 2400 dpi, which is an integer value that is distinct from the "x" direction machine resolution. However, the "y" direction output resolution can be a non-integer resolution. In other words, the "y" direction output resolution can be a variable resolution (which can include a non-integer value that is distinct from the "x" direction output resolution value).

The appropriate lenticular lens is selected to accommodate the image and the predetermined viewing distance. For a large application, such as a billboard or bus shelter, or a vending machine facade, a thick, coarse lenticular lens is usually preferred. For smaller application, such as a cup, a label or a package, a fine lenticular lens is typically preferred. Coarse lenticular lenses have fewer lenticules per linear inch than fine lenticular lenses. Other factors often considered in the choice of a lenticular lens include the thickness, flexibility, the viewing distance, the cost of the lens, and the method of printing the image (e.g., sheet-fed, lithographic, web, flexography, screen-print, etc.), among others.

Preferably, the interlaced image is then printed directly (as described above) to the typically substantially flat back surface of the appropriate lenticular lens. Alternatively, an indirect printing method can be used in which the interlaced image is printed to a substrate, and the image and substrate subsequently joined (e.g., using an adhesive) to the lenticular lens. In yet another embodiment, an interlaced image can be joined in a nonpermanent fashion to the lenticular lens so that the position of the image can be altered or adjusted with respect to the lens, or the image itself interchanged. In all of the above-described instances, correspondence between the interlaced image and lenticular lens is maintained, as shown and described herein.

FIG. 8 is a schematic end view of lenticular image 35 in which interlaced image 41 is joined to lenticular lens 40 having lenticules 42a-b. Interlaced image 41 includes interlaced image segment 46. As shown, there is a lack of correspondence between interlaced image segment 46 of interlaced image 41 and lenticule 42a of lenticular lens 35.

FIG. 9 shows a schematic end view of lenticular image 50 in which interlaced image 51 is joined to lenticular lens 52 having lenticules 54a-b. Interlaced image 51 includes interlaced image segment 56. As shown, correspondence exists between interlaced image segment 56 of interlaced image 51 and lenticule 54a of lenticular lens 52.

As used in the context of a lenticular image, "correspondence" means that each interlaced segment is covered or substantially covered by one lenticule and that the lenticule and interlaced segment are substantially congruent with one another. Correspondence is easily confirmed by viewing the interlaced image (i.e., the image comprising the interlaced segments arranged in the desired order) through the lenticular lens (i.e., the lenticular image) at a predetermined or desired viewing distance.

As a practical matter, there is typically not a precise one-to-one correspondence between an interlaced image segment of a corresponding interlaced image and the lenticule of the lens which overlays the segment. Rather, each interlaced image segment may be made coarser (i.e., wider) or finer (i.e., narrower) than the lenticule of the lens which overlays it. For example, to accommodate an increase in size of an interlaced image during printing, a phenomenon known as "press growth", interlaced image segments are typically designed or created to be finer than the lenticules of the lens which will ultimately overlay them. Again, correspondence can be confirmed by viewing the interlaced through the lenticular at a predetermined or desired viewing distance to determine whether the desired illusion of multidimensionality is created.

Thus, as illustrated in FIG. 8, correspondence is not achieved since interlaced segment 46 is not covered or substantially covered by lenticule 42a. Moreover, lenticule 42b covers frame segment $1_1$ of interlaced segment 46. However, in FIG. 9, the entire interlaced segment 56 is covered or substantially covered by lenticule 54a. In practice, lenticular image 50 will provide an illusion of multidimensionality to a viewer with little, if any, distortion. In sum, lenticular image 50 can be said to be a "corresponding lenticular image" and interlaced image 51 can be termed a "corresponding interlaced image". It is of particular note that the pitch of the lenticular lens has not been varied from FIG. 8 to FIG. 9.

Figure 10:
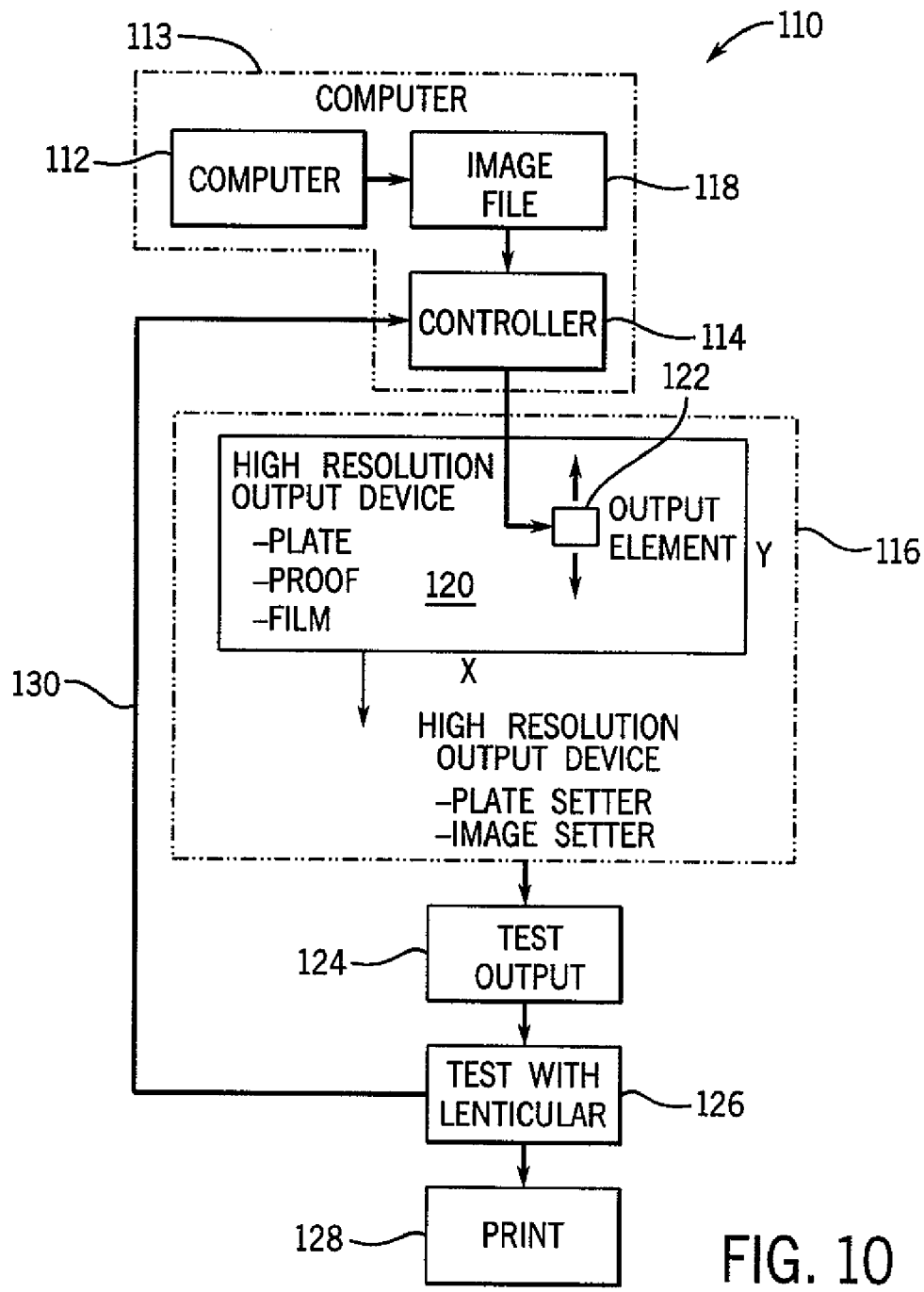
FIG. 10 is a schematic diagram illustrating the present invention.

FIG. 10 is a schematic diagram illustrating one aspect of the present invention, which is generally referred to by the numeral 110, which can include a computer 112, a controller 114, and a high resolution output device 116. Computer systems can also be used that comprise one or more of the above-described items, as indicated by dashed line 113. The high resolution output device will preferably be in communication with the computer and the controller. Computer software located at computer 112 can be used to create, send and/or receive interlaced image file 118 and can include instructions for creating an interlaced image that will ultimately be joined to a lenticular lens to create a lenticular image. Ultimately, image file 118 is transmitted from computer 112 to output device 116 (e.g., an image setter, plate setter, etc.) capable of creating an output 120 (e.g., a plate, a proof, or film) using output element 122 (e.g., an exposure element), which itself is typically in communication with controller 114. Output 120 will be tested or used 124 to create an interlaced image which can be tested 126 with an appropriate lenticular lens. If correspondence is achieved, a full print run 128 can be initiated. If correspondence is not achieved, the output resolution varying feedback loop 130 can be utilized to adjust or vary the output resolution (e.g., the output resolution in the "x" direction) to obtain a varied resolution of the output 120 (or simply a "varied output resolution") using controller 114 and output element 122.

Figure 11:
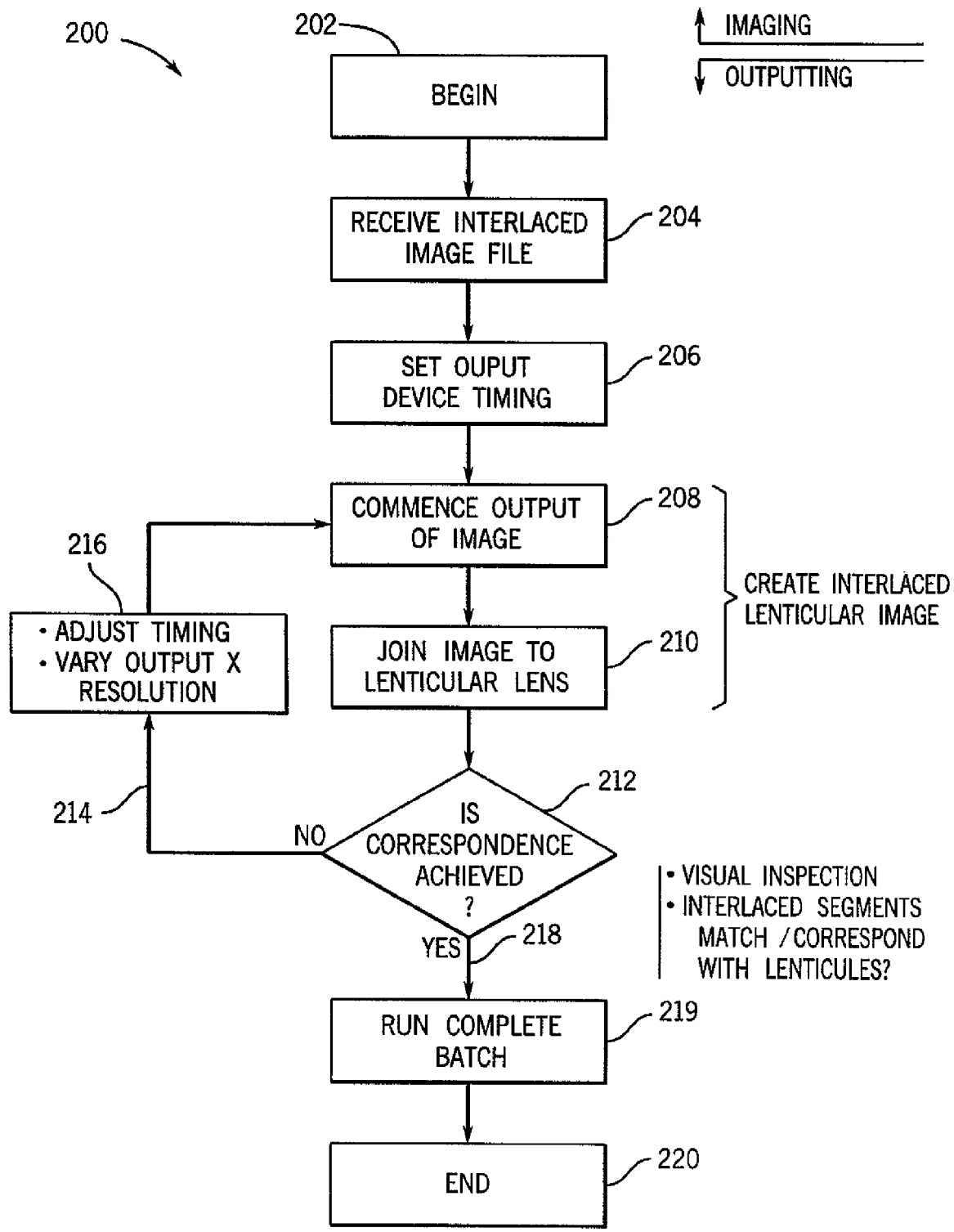
FIG. 11 shows a flow chart illustrative of a method in accordance with one aspect of the present invention.

FIG. 11 shows a flow chart illustrating a method of outputting (i.e., following any imaging techniques being performed), generally referred by numeral 200, in accordance with the present invention. The output process begins 202 by receiving 204 an interlaced image file having "x" and "y" interlaced image resolutions (which may or may not be distinct). An initial timing for the output device is set 206 either by default or initial setting, typically based on the presumed pitch of the lenticular lens material being used (e.g., 101.5 lpi). Following this initial timing setting, the interlaced image file is output 208 (e.g., to a plate, proof, or film) which may be a separate operation from or include joining 210 the interlaced image to the lenticular lens. It must then be determined 212 whether correspondence has been achieved, that is, if the interlaced segments substantially match or mimic the lenticules of the lenticular lens. This is typically accomplished by visual inspection (e.g., the interlaced image is viewed through the lens to confirm correspondence). If not in correspondence 214, the output x resolution of the interlaced image file is varied 216 to obtain a varied output resolution and the interlaced image file is again output 208, joined 210, and correspondence is determined 212. If correspondence is achieved 218, the lenticular image is in its desired form, and a complete print run 219 of lenticular images can be run. If not, the varying process and subsequent testing can be repeated until the desired correspondence is achieved, bringing the correspondence outputting method to a conclusion 220.

Figure 12A:
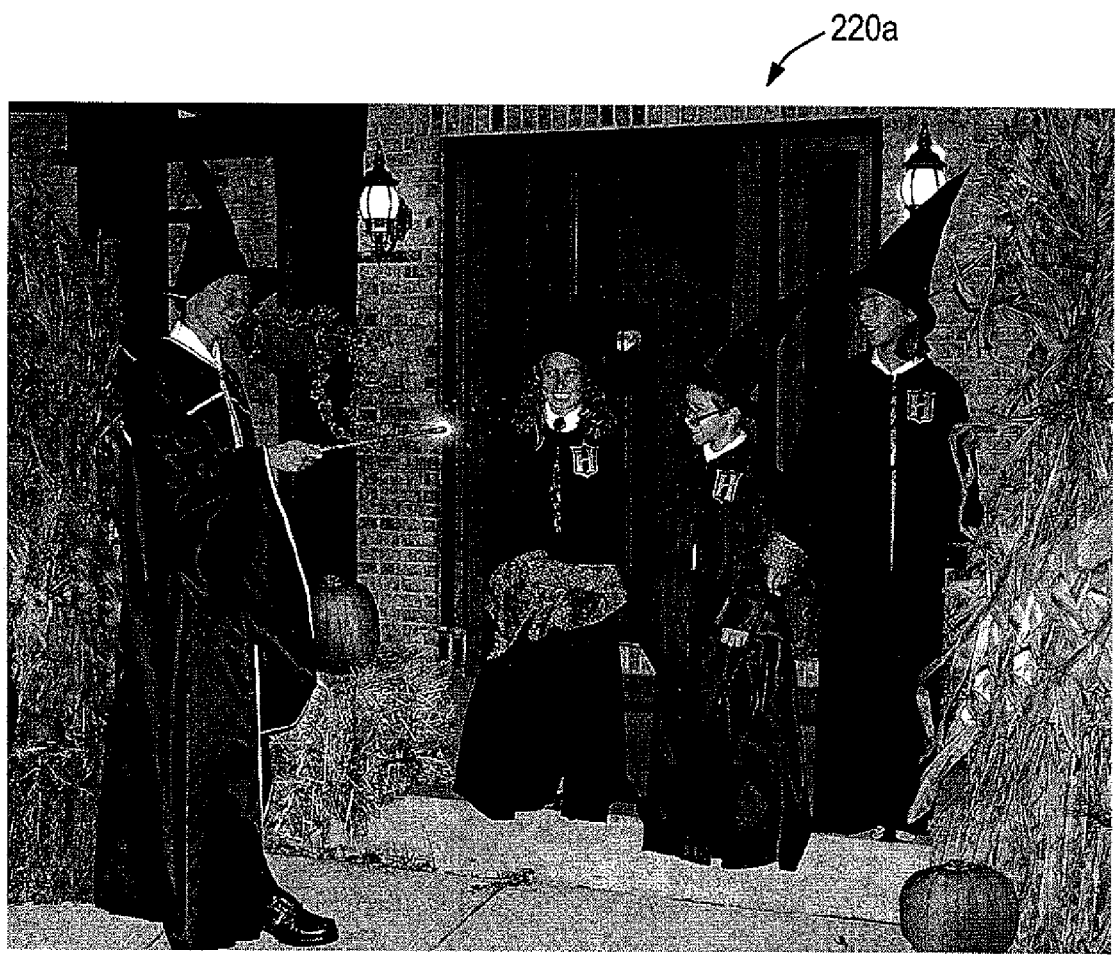
FIGS. 12a-c show examples of digital frames and an interlaced image where correspondence has been achieved according to the present invention.
Figure 12B:
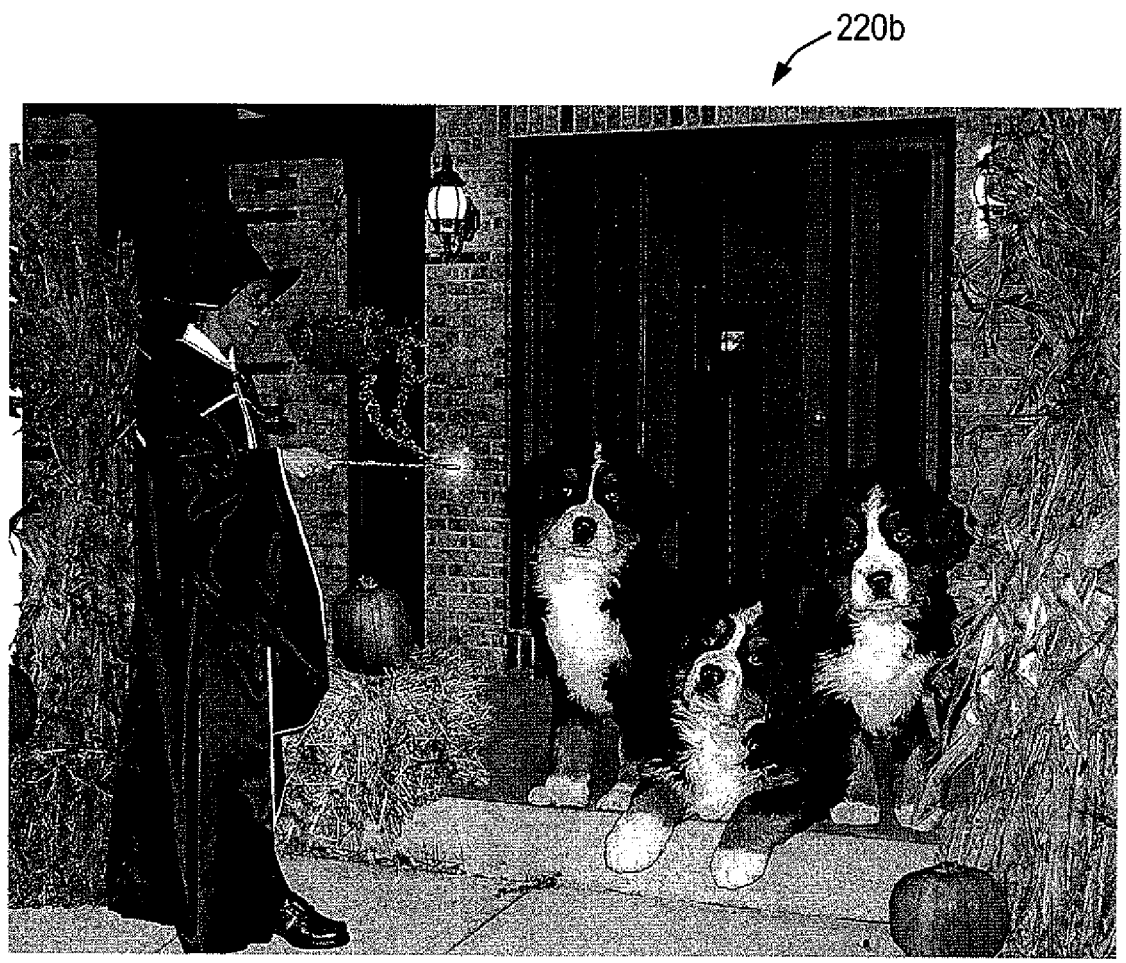
Figure 12C:
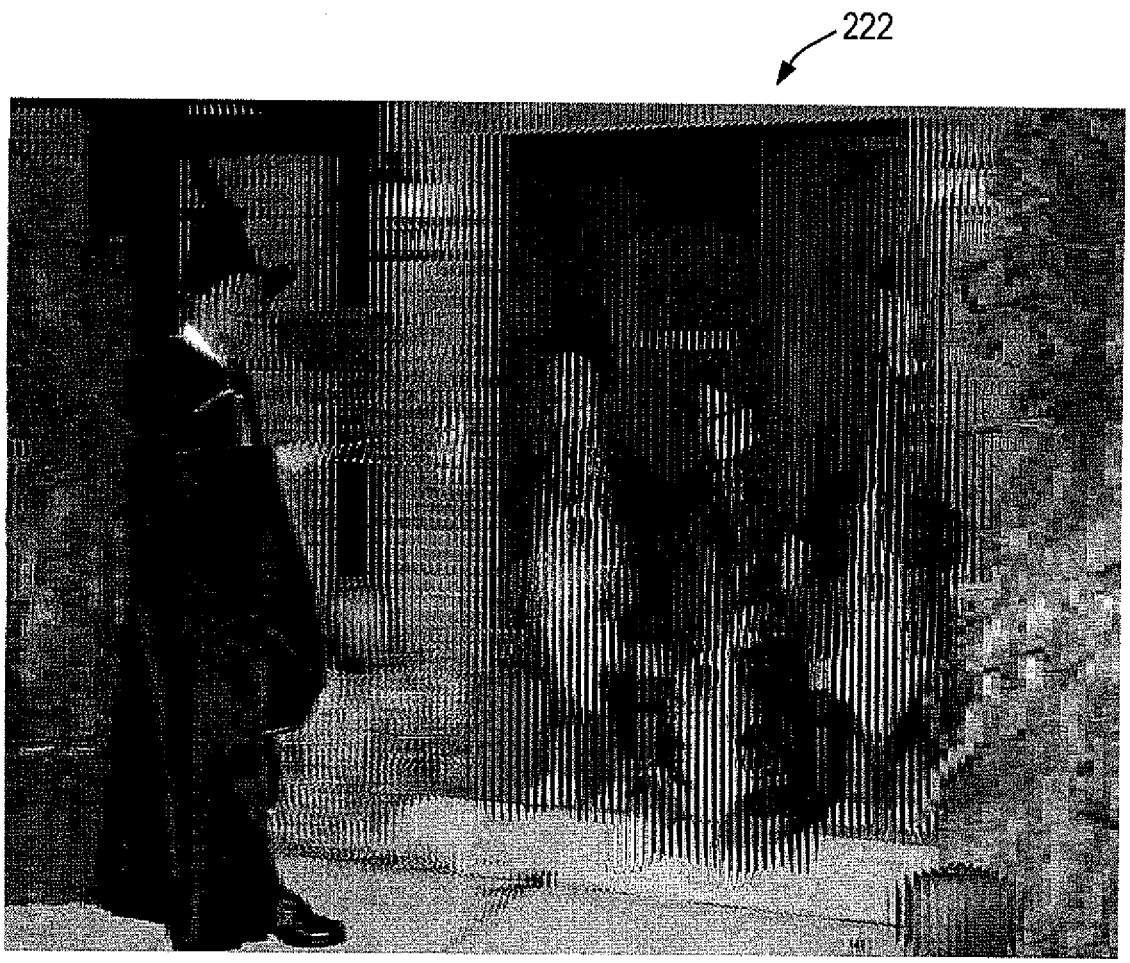

FIGS. 12a-c show examples of digital frames 220a-b and interlaced image 222 created in accordance with a preferred embodiment of the present invention. Interlaced image 222, comprising digital frames 220a-b, is illustrative of an image in which correspondence has been achieved between the interlaced image segments of the image and the lenticules of the lens to which it will be joined using the apparatus and procedures shown and described herein.

Figure 13:
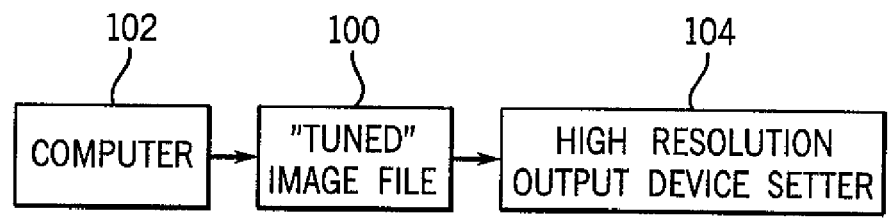
FIG. 13 is a diagram illustrating one mode of achieving correspondence through varying image file resolution.

As shown in FIG. 13, digital frame or interlaced image file 100 can be adjusted or "tuned" using a computer 102 prior to output 104, which again is preferably accomplished using a high resolution output device. In one preferred embodiment, digital frames are created to have a "square" resolution, that is, the first (e.g., x) and second (e.g., y) resolutions are the same or substantially the same. In this embodiment, the frames can be sent to a RIP, typically associated with the output device, and thus are rasterized so as to result in a non-square file having distinct and potentially different resolutions. In one example, a digital frame having first and second frame resolutions of 1218 ppi is rasterized in a fashion that results in a file having a first resolution of 2436 dpi and a second resolution of 2400 dpi.

In a preferred embodiment, the corresponding interlaced image is joined to a high definition lenticular lens, as shown and described in U.S. patent application Ser. No. 09/816,435, which is incorporated herein by reference.

Other embodiments are contemplated and within the scope of the present invention. For example, in one aspect, the present invention is directed to a method of producing a lenticular image, the method comprising: creating a plurality of digital frames comprising a first distinct frame resolution correlating to a first direction and a second distinct frame resolution correlating to a second direction; compressing at least one of the digital frames in at least the first direction; creating at least one interlaced image from at least two of the plurality of digital frames, the interlaced image comprising at least first and second interlaced image resolutions correlating to the first and second directions; screening the at least one interlaced image in the first direction and the second direction to create a screened interlaced image; outputting the screened interlaced image utilizing an output device that can output the screened interlaced image at two distinct resolutions correlating to the first and second directions, at least one of the two resolutions a variable output device resolution, such that a correspondence is maintained between the interlaced image and a lenticular lens in at least one direction; and creating a lenticular image by joining the interlaced image to the lenticular lens.

In another aspect, the present invention is directed to a method of producing a lenticular image having a first resolution and a second resolution the method comprising providing a lenticular lens comprising a plurality of lenticules; outputting a screened interlaced image utilizing an output device that can output the screened interlaced image at two distinct resolutions correlating to a first direction and a second direction, at least one of the two resolutions a variable output device resolution, such that a correspondence is maintained between the interlaced image and a lenticular lens in at least one of the directions; and creating a lenticular image by joining the screened interlaced image to the lenticular lens.

In yet another aspect, the present invention is directed to a method of producing a screened interlaced image having a first resolution and a second resolution, the interlaced image for use in a lenticular image, the method comprising creating a plurality of digital frames comprising a first distinct frame resolution correlating to a first direction and a second distinct frame resolution correlating to a second direction; compressing at least one of the digital frames in at least the first direction; creating an interlaced image from at least two of the plurality of digital frames, the interlaced image comprising at least first and second interlaced image resolutions correlating to the first and second directions; and screening the at least one interlaced image in the first direction and in the second direction to create a screened interlaced image having a first distinct resolution and a second distinct resolution, the first and second resolutions correlating to the first and the second directions.

The present invention provides an image that can impart the illusion of multidimensionality by tuning the resolution of an image, and more specifically an interlaced image, in at least two directions, for example, a first direction having a variable resolution and a second direction having a fixed resolution, the variable resolution maintaining a correspondence to an appropriate lenticular lens.

In the present invention, digital frames are created to have at least a first frame resolution and a second frame resolution. These frame resolutions can correspond to first and second dimensions of the digital frame (e.g. a width and a height).

In general, the present invention is directed to a method of producing multidimensional lithographic separations and multidimensional images that can incorporate more digital image frames than was previously possible for a given file size. In one example, multidimensional images made according to the present invention can include twice the number of frames with half the file size. In essence, the file size requirement for a given multidimensional image can be reduced while simultaneously increasing the number of frames used to create the multidimensional image itself.

Although the construction of an interlaced image has been described from the perspective of columns, interlaced images can also be constructed from the perspective of rows or other groups of pixels if particular effects are desired. For example, creating motion from an array of rows allows the composite image to be displayed in any perspective forward of the viewer, e.g., in an overhead, on a wall or billboard, in a floor panel, etc. As the viewer moves toward the display, regardless of angle, but preferably from a relatively perpendicular approach, the viewer perceives the intended motion.

Specific types of lenticular images include, but are not limited to, "flip images," "morph images," and "zoom images," among others. Flip images comprise at least 2 base images and can impart motion and/or change from one image to another as the viewer's position changes with respect to the lenticular image being viewed. Morph images are similar to flip images except that images transform or more fluidly change from one image to another as the viewer's view position changes. Zoom lenticular images, as the name implies, provides the illusion of image magnification as a viewer's viewing position with respect to the interlaced image being viewed changes.

The process of this invention is preferably a direct lithographic process that eliminates the need to output intermediate art that would later require separation from the interlaced image (i.e., the image that is joined to the lenticular lens to create the lenticular image). The process results in direct creation of lithographic separations either in the form of a film or, preferably, a plate. In the art, this is known as Computer to Plate (or "CTP").

In a CTP workflow, images that will be printed are plotted directly to the printing plate from digital data without any intermediary film. In CTP processing, every plate is considered to be a "master" that is made directly from the same digital data. CTP processing can produce sharper dots than conventionally imaged plates. The dots register more effectively, more faithfully reproduce more of the tonal range, generate less dot gain. Thus, using CTP, better image resolution and correspondence can be achieved, and better registration can be obtained from plate-to-plate and from color to color.

Exemplary digital plate types that are currently available include: a photopolymer such as the N90-A; a silver halide such as Lithostar and Silverlith; hybrids composed of both a photopolymer and a silver halide; and thermal plates. All of these technologies are capable of generating high quality printing, though it is noted that photopolymer plates offer the advantage of long run lengths (e.g., on the order of 500,000 runs or more) and silver halide plates support finer screen rulings (e.g., on the order of 175 lpi or more).

Methods have been described and outlined in a sequential fashion. Still, elimination, modification, rearrangement, combination, reordering, or the like, of the methods is contemplated and considered within the scope of the appending claims.

In general, while the present invention has been described in terms of preferred embodiments, it is recognized that equivalents, alternatives, and modifications, aside from those expressly stated, are possible and within the scope of the appending claims.

What is claimed is:

1. A method of making a corresponding lenticular image using a computer-to-plate ("CTP") system, the method comprising:
   providing an output device in communication with a computer having a memory;
   receiving into the computer memory an interlaced image file;
   converting the interlaced image file into an output having an output resolution;
   varying the resolution of the output to define a varied output resolution;
   creating a corresponding lenticular image using the output at the varied output resolution;
   wherein the output device is a plate setter and the output is a plate; and
   wherein the method of the varying is accomplished using a time-keeping element.

2. The method of claim 1 wherein the varying includes increasing the resolution of the output such that the varied output resolution is greater than the resolution of the output.

3. The method of claim 1 wherein the varying includes decreasing the resolution of the output such that the varied output resolution is less than the resolution of the output.

4. The method of claim 1 wherein creating the corresponding lenticular image includes joining a lenticular lens having a pitch to an interlaced image comprising a plurality of frames.

5. The method of claim 1 wherein the varied output resolution is equal to $$L \times f$$

where L is a lenticular lens pitch and f is the number of frames in an interlaced image.

6. A corresponding lenticular image comprising:
   a lenticular lens having a front surface that includes a front surface having a plurality of lenticules and a substantially flat surface opposite the front surface;
   an interlaced image joined to the lenticular lens;
   wherein the interlaced image is created from an interlaced image file that has been received in to a computer memory and, when so received, is converted into an output having an output resolution; and
   wherein the resolution of the output has been varied to define a varied output resolution; and
   wherein the varied output resolution is obtained using a time-keeping element.

7. The method of claim 6 wherein the output device is a plate setter.

8. The method of claim 6 wherein the output is a plate.

9. The method of claim 6 wherein the output device is an image setter.

10. The method of claim 6 wherein the output is an interlaced image.

11. The corresponding lenticular image of claim 6 wherein the interlaced image includes a plurality of interlaced image segments and correspondence is achieved between the interlaced image segments of the interlaced image and the lenticules of the lenticular lens.

12. The corresponding lenticular image of claim 6 wherein the output is one of a plate, a proof and a film.

* * * * *